Jan. 5, 1965  E. L. MERRITT  3,164,073
ZENITH CAMERA

Filed June 9, 1961  3 Sheets-Sheet 1

INVENTOR.
EVERETT L. MERRITT
BY William V. Peace
ATTORNEY.

Jan. 5, 1965 E. L. MERRITT 3,164,073
ZENITH CAMERA
Filed June 9, 1961 3 Sheets-Sheet 3

INVENTOR.
EVERETT L. MERRITT
BY
ATTORNEY.

United States Patent Office 3,164,073
Patented Jan. 5, 1965

3,164,073
ZENITH CAMERA
Everett L. Merritt, Falls Church, Va., assignor, by mesne assignments, to Raytheon Company, a corporation of Delaware
Filed June 9, 1961, Ser. No. 125,316
3 Claims. (Cl. 95—1.1)

This invention relates to cameras and particularly to an improved type zenith camera involving a new concept in strumentation, field operating procedures, and data reduction for determining astronomic positions on the earth's surface from photographs of the stars.

Because of the speed and efficiency of field observation, zenith cameras have been utilized for many years to determine the approximate positions in latitude and longitude of a particular point on the earth's surface. In operation such cameras point towards the zenith by reference to one or more level bubbles with several star exposures being made on glass photographic plates or film while simultaneously the exact time of each exposure is determined by the utilization of radio time signals derived from government facilities and/or an accurate type chronometer. After development of the exposed plates or film, the relative positions of star images are precisely measured and the position of the camera zenith point on the celestial sphere is then determined by a comparison with star positions as tabulated in an astronomic catalog. Conversion from position on the celestial sphere to a position on the earth is accomplished mathematically by utilizing the field records of time.

However, the primary disadvantages of classical zenith cameras is the lack of precise accuracy and speed with which positions may be determined. The present type instrument itself may be applied only in cases where the accuracy tolerance is several arc seconds in latitude and longitude. If improved results are required, it has been necessary for the geodesist to employ precision astronomic theodolites requiring highly skilled observers and many hours of observing time at each individual station. The camera contemplated herein embodies a completely new concept and method for data handling, the associated instrumentation permitting the determination of position to an accuracy of 0.25 arc second or even better. It exploits the scientific fact that levelling devices have far greater precision in recovering relative orientation than establishing absolute orientation. It is one of the principal objects of the invention to provide a more improved type zenith camera.

Another object of the invention is to increase the accuracy of vertical orientation, with the vertical orientation being dependent on precision and not the absolute accuracy of a vertical reference unit.

Another object of the invention is to provide a procedure of producing vertical autocollimation, introducing only random errors which errors may be eliminated by computational processes.

Another object of the invention allows operational time sequencing and calibrational procedures which account for the removal of systematic errors and permits true conjugacy in the measurement of photographic star images.

A still further object of the invention is to permit a fixed relation between the principal axis and vertical reference for the elimination of errors which are normally introduced by the lack of spindle symmetry.

And still a further object of the invention is the introduction of a large objective lens for the purpose of recording a greater quantity of star images.

Other objects and advantages of the invention will be apparent from a study of the specifications and the accompanying drawings.

Figure 1:
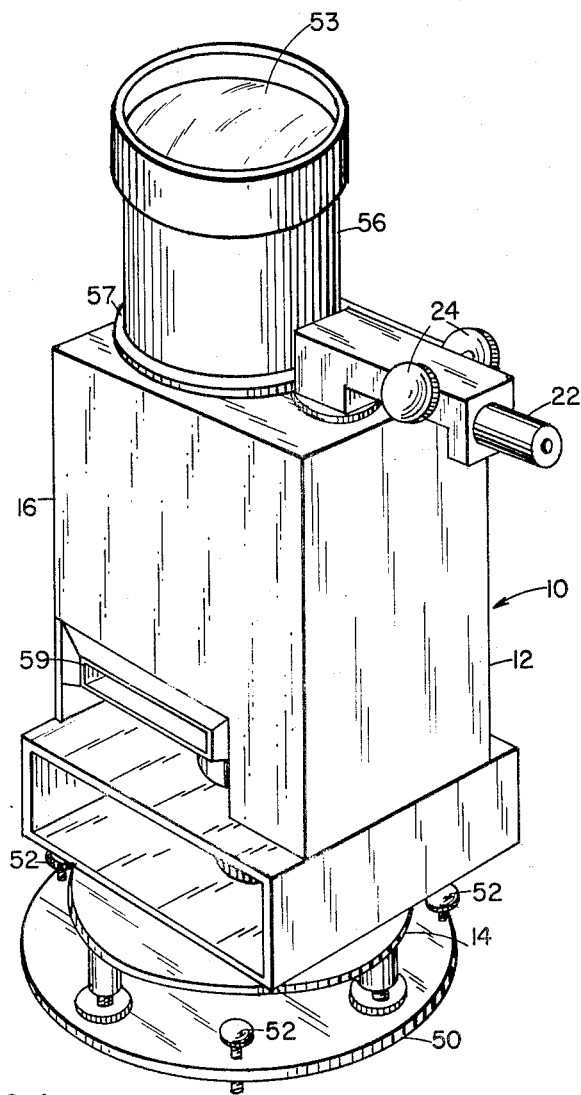
FIGS. 1 and 2 show in perspective the zenith camera according to the invention.
Figure 2:
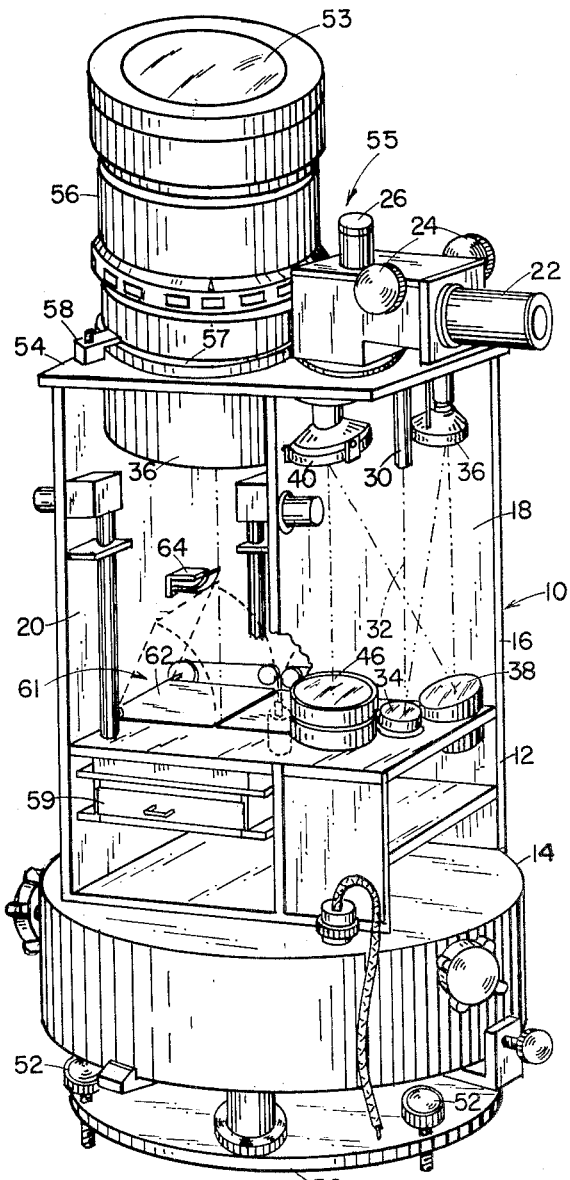

Now referring to the drawings in which similar parts will be designated by like reference numerals there is shown a zenith camera 10 comprising a camera enclosure or housing 12 having a base 14 to which is attached a casing 16 divided into a pair of compartments 18 and 20. The compartment 18 has disposed therein an optical autocollimation system which serve as a reference to assure that direction of camera pointing remains constant regardless of the rotational orientation of the camera focal plane. In general, the optical autocollimator comprises a telescopic eye piece or viewer 22 adjustable by a pair of driving screws 24 for adjusting the eye-piece for proper focusing and a light source 26 preferably an electric lamp and the like. The light source is adapted to direct light rays via prism 28 through a cylindrical column 30 which directs the light beam 32 through a light beam bending mirror array composed of deflecting mirrors 34, 36, 38 and 40 for the purpose of imaging an index or marker figure (not shown) onto a shallow pool or bath of mercury 42 contained in a vessel 44 for the purpose through lens 46. The eye-piece 22 is rotatable about the column 30 and thus permits the operator to remain substantially fixed in one position while the camera 10 is turned to any desired angular orientation.

Motion of the camera from the vertical will cause the index image on the pool of mercury to dislocate from the center of the viewing eye-piece. To realign the camera with the vertical, it is necessary to orient the camera in such a manner, to be subsequently explained, so that the eye-piece will again view the image index at its central portion. When this is accomplished, the camera will be realigned in the vertical direction. It is possible to get an approximate alignment with the vertical by the utilization of so-called standard level bubbles which may be attached to the camera proper. This permits rough adjustments before the optical autocollimator is brought into operation. However, fixed bubble procedure renders an operational difficulty in that time is required to recover the bubble when making the necessary level adjustments.

More specifically, as the definition of a zenith camera applies to the present design, the zenith camera is a single-purpose instrument with one degree of freedom in an azimuthal rotation of the nominal optical axis about the vertical axis or vertical spindle. The camera proper is mounted to a pedestal 50 having adjustable screws 52 peripherally spaced and threadably adjustable with the said pedestal. The adjustment of the screws 52 permits the alignment of the camera with the vertical whenever the said screws are in contact with some base formation from which the camera is to take photographs. The camera itself is rotatable about the vertical spindle, not shown, so that it can be positioned angularly for the purpose of taking several different exposures of the star pattern. An observation consists of several time referenced zenithal star exposures with various azimuthal orientations on the same photographic plate. The star images are such as may be identified by comparison with a star chart and the x and y coordinates measured on a measuring machine having an accuracy and least reading of one micron. Star images are selected that ideally define equilateral triangles with the principal point at the center in all azimuthal positions. These stars are reduced to their apparent places for the times of the exposures. The camera coordinates combined with star places are employed to determine the interior orientation and the astronomic directions cosines of the principal point in the direct and reverse positions. The mean of the several positions are taken as astronomic coordinates of the camera station.

The camera is provided with a large diameter objective lens 53 mounted to the upper portion of compartment 20. The closure cover 54 of the upper compartment 20 is provided with a hole for the purpose of receiving the lens assembly 55. The lens barrel 56 is provided with an integral flanged peripheral ring 57 which seats on the closure cover 54 and is clamped thereto by a clamp 58. The lens 53 is made to image photographic information from whatever source available on to a sensitized photographic plate 59 which is disposed to be mounted upon an optical flat ring 60. It is possible to provide a pressure plate for the purpose of holding down fast the sensitized photographic plate to the pressure plate to prevent its movement.

There is further disposed in the compartment 20 a shutter arrangement 61 comprising a pair of shutter plates or doors 62 pivotally mounted at one of their extremities so that upon closure the other extremity of the said plates will overlap thereby avoiding any leakages of light. Further, the shutter plates are operated in such a manner so as to permit the recordation of time at the start of an exposure and for the duration thereof. This particular feature is accomplished by permitting the shutter plates to engage a pair of contacts 64 which are connected to an external timing circuit, not shown in the drawings, so that at the instant of contact an accurate clocking mechanism will commence to operate and at the time of shutter closing the contacts will be interrupted, the circuit broken, and the timing mechanism stopped so that the absolute and elapsed time will be a matter of record.

Figure 4:
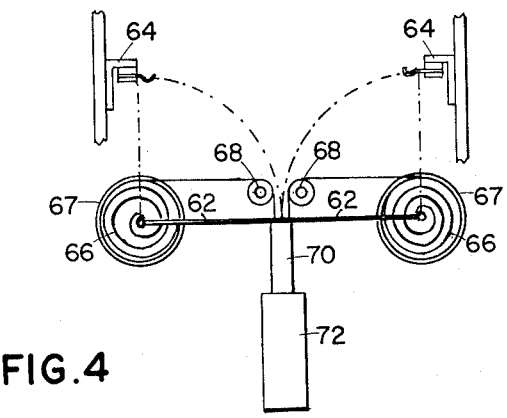
FIG. 4 shows the shutter mechanism of FIGS. 1 and 2 in complete detail.

FIGURE 4 shows the shutter mechanism in more detail and the combined parts thereof and their method of operation. It may be appreciated that the particular shutter mechanism as embodied in the instant invention is merely one scheme of operation. There are other schemes which may be employed and the fact that they may should not detract from the novelty of the invention as embodied herein. The shutter mechanism in particular comprises a pair of shutter doors 62 fixedly attached to a pair of rotatable wheels 66 which are in turn attached to a pair of helically wound springs 67 forming an integral part thereof, the said springs being disposed to cause the shutter doors to close when unopposed by any other external forces. The wheels are frictionally engaged at their periphery by a pair of cables which are guided by a pair of freely rotatable pulley wheels 68 and fixedly attached to a solenoid plunger 70, said plunger, when magnetized, being pulled down into a cylindrical type housing 72 about which a solenoid coil is wound. When the solenoid coil is excited by some external electrical source (not shown) plunger 70 will be pulled down thereby causing the wheels 66 to rotate in a direction to cause the shutter doors to close. Simultaneously with the closing of the shutter doors, the circuit contacts 64 will become disengaged therewith, thereby permitting the external timing mechanism to function. When the solenoid is released, the helically wound springs will cause the wheels 66 to operate in a reverse direction to permit the shutter doors to open and to again make contact with the circuit contacts 64 so as to again actuate the timing unit. This sequence is repeated every time an exposure is made with respect to the photographing of the star images.

Figure 3:
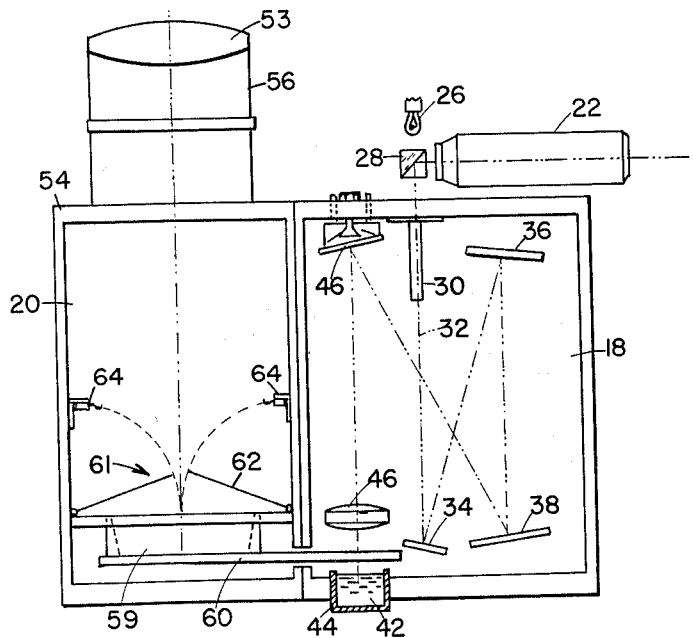
FIG. 3 shows a diagrammatic sketch of a portion of the camera shown in FIG. 1 embodying the principal parts of the camera and their particular modes of operation.

As previously explained, the optical autocollimation system for accurately placing the camera vertical is novel with this particular zenith camera. It has been done with a view towards ease of operation and reduction of elapsed time between opposing positions of the photographic plate. Further, it is possible to achieve vertical orientation accuracy of 0.1 second with a coincidence of the vertical to the artificial horizon and the mechanical vertical of ±5 seconds. It is also necessary in such a system that the vertical must coincide with the optical axis of the lens system within one minute of arc in order to remove the systematic errors of lens distortion and atmospheric refraction. The systematic errors are removed by the selection of conjugate images; that is, images defining a star triangle in any position of the plate must be the same stars selected for all other positions of the plate. Now lens distortion is radial from the principal point and atmospheric refraction is radial from the zenith point. It is impossible, therefore, to remove both systematic errors in a selected conjugate star triangle unless the principal point and zenith point coincide within one minute of arc. Perfectly symmetrical star triangles are impossible to select in nature, but if the stars are recorded at the same instant of time, and if the principal point coincides with the Zenith point within one minute of arc, the systematic errors of lens distortion and atmospheric refraction can be removed from the reduction even though the star triangles are asymmetrical to a high degree. Statistical tests demonstrate that nine conjugate star triangles of 27 conjugate star images are necessary to obtain a mean position accuracy of 0.1 second. The number of stars required to select 27 conjugate star images can only be imaged with a lens having a 5 inch diameter or at least three times the area of a 2.7 inch lens. In order to obtain the number of conjugate images required for the specified over-determination, the new zenith camera is equipped with the equivalent of an Eastman Kodak Aero-Ektra lens with an equivalent focal length of 305.01 millimeters and a maximum aperture of $f/2.5$ or a diameter of 4.8 inches which has slightly more than three times the area of the 2.67 lens. However, it has been found from experience, shutters adapted to a 4.8 inch diameter lens are notorious for their vibrations. The shutter apparatus shown in schematic form in FIG. 3 was designed to overcome this objection. The shutter as previously discussed consists of a two element louver type of shutter under spring tension in the closed position and is opened against spring tension with a single linear solenoid 72. Both extremities of the shutter travel are vibration dampened in the usual manner. The open extremity of the shutter travel closes a circuit via contacts 64 previously described which actuates a precise timing mechanism of any of the well-known variety. One such timer would be an Omega timer of the type situated at the United States Naval Observatory. This particular timer prints out hours, minutes, seconds, hundredths of a second directly with an interpolation dot for milliseconds. It prints automatically on a strip of paper the time in hours, minutes, seconds, tenths and hundredths of a second at speeds up to 10 per second with immediate reading. The timer contains a quartz clock which guarantees a precision of zero to one-tenth of a second in 24 hours and is adapted to calibration against radio time signals.

The shutter is located in proximity to the focal plane 71 so that it may be as small as possible, and further, that it may not introduce distortions arising out of placing an aperture immediately in front of, or behind a lens. The focal plane as shown herein has a circular diameter of 3.5 inches. This diameter is a balance between a zenith angle small enough to eliminate abnormal refraction and distortion and large enough to provide spatial strength in the photographic pyramid defined by the lens nodal point and any star triangles.

During field operations, each photographic plate is exposed several times with the camera in various horizontal rotational positions about the vertical. Vertical orientations is recovered just prior to each exposure by reference to the autocollimator. Because of high surface tension of the mercury pool there is a rapid settling of the reflector surface thereby permitting rapid sequencing of photographic exposures. The time of each shutter opening and closing is determined by referring to either radio time signals or the chronometer of the Omega type.

previously mentioned. A complete field observation includes exposure of one or more photographic plates. By utilizing the autocollimator as a standard for camera pointing and exposing each photographic plate a plurality of times in various rotatonal orientations there is provided a distinctive means for an accurate recovery of the zenith point on the celestial sphere. By using a large diameter lens an abundance of star images are available so that there is a greater freedom of selection and choice of those stars which will give the desired accuracy of measurement. Hence, this procedure allows measurements of questionable accuracy to be discarded without greatly reducing the quantitative data available for computation of position. The ability to make multiple exposures on each photographic plate while very precisely maintaining vertical camera orientation plus the ability to measure and record an abundance of star images yields an overdetermination, or redundancy, of observational data which is so essential to accurate scientific measurement.

Having defined the invention, what is claimed is:

1. An astronomical camera comprising a housing having two compartments, one compartment carrying vertical autocollimator means embodying a folded optical system, a lght source at one end of the system, a reflecting medium permanently located at the other end of the system, and viewing means for viewing images reflected by the reflecting medium, the second compartment carrying an optical lens system independent of said folded optical system, film retaining means in the optical path of said lens system, shutter means positioned between the film retaining means and the lens system, and means for rotating said housing about a first vertical axis, said viewing means being mounted on said housing for rotation about a second vertical axis whereby viewing may be accomplished simultaneously with rotational movement of the housing about said first axis.

2. A camera substantially as set forth in claim 1 wherein the reflecting medium is located in a vessel immovably fixed to the housing and has a viewing surface directed toward the optical system, which surface is constantly level regardless of the position of the vessel and of the camera.

3. A camera substantially as set forth in claim 1 wherein a column of light-transmitting material extends through the housing between the light source and the folded optical system, a prism is positioned between the light source and the adjacent end of the column, and the viewing means extends from the prism at 90° with respect to the light source.

References Cited by the Examiner
UNITED STATES PATENTS

| | | | |
|---|---|---|---|
| 2,210,090 | 8/40 | Lutz et al. | 95—1.1 |
| 2,273,876 | 2/42 | Lutz et al. | 95—1.1 |
| 2,384,666 | 9/45 | Wood | 95—18 |
| 2,393,575 | 1/46 | Steiner | 95—12.5 |
| 2,460,836 | 2/49 | Lovins | 88—1 |
| 2,468,781 | 5/49 | Roganti | 95—12.5 |
| 2,792,767 | 5/57 | Schmidt | 95—12.5 |
| 2,922,346 | 1/60 | Smith | 95—1.1 |
| 3,002,278 | 10/61 | Weems | 33—1 |

NORTON ANSHER, Primary Examiner.

R. C. PINKHAM, JOHN M. HORAN, Examiners.